March 29, 1966 S. W. BOREEN ETAL 3,243,518

DIAL FOR ENCODING IN MAGNETIC STORAGE TYPE TELEPHONE DIALERS

Filed Dec. 24, 1962

INVENTORS
STUART W. BOREEN
JAMES W. HEALY
GEORGE S. LOCKWOOD, JR.
BY Fryer & Tjensvold
ATTORNEYS United States Patent Office 3,243,518

Patented Mar. 29, 1966

3,243,518

DIAL FOR ENCODING IN MAGNETIC STORAGE TYPE TELEPHONE DIALERS

Stuart W. Boreen, Belmont, Calif., James W. Healy, Wakefield, Mass., and George S. Lockwood, Jr., New York, N.Y., assignors to Dasa Corporation, a corporation of California Filed Dec. 24, 1962, Ser. No. 246,820
2 Claims. (Cl. 179—90)

This invention relates to dials for magnetic storage type telephone dialers and particularly to means for enabling the use of a standard type telephone dial mechanism for producing impulses for a magnetic code representing the digits of a telephone number and insuring proper and uniform interdigital spacing.

Automatic telephone dialers of the magnetic storage repertory type are now known and the circuitry for such a dialer is disclosed in my assignee's co-pending application for United States Letters Patent entitled "Equipment and Methods for Automatic Dialing," filed April 30, 1962, Serial No. 191,050. Said application discloses a circuit for a dialer in which coded numbers are imposed on a magnetic storage medium by electric impulse creating mechanism similar to and operating in the same fashion as a conventional telephone dial. Thus, a subscriber can encode a number on the storage medium, for later and repeated use, by simply "dialing" the number in the same manner as that conventionally used in placing a telephone call.

Since one of the prime objectives in automatic telephone dialing is the saving of time, the interdigital spacing for timing, which varies greatly in manual dialing should be uniform and as short in time as is consistent with accurate selection of circuits with mechanisms employed by telephone companies. Prolonged interdigital spacing of a coded number might also exceed the space available on a magnetic tape or other types of storage media; and furthermore, in machines of the kind disclosed in the above-mentioned co-pending application, interdigital spacing of an encoded number is varied purposely. For example, a greater-than-normal spacing between digits is employed to interrupt operation of the dialer so that the calling party can await a dial tone which signals the necessity to resume dialing.

In normal manual dialing, greater time is required to wind up or load the spring of a dial for the digit nine, for example, than for the digit one or two. Also, the time required for a person to select and place a finger in a digit opening of the dial varies greatly even with professional telephone operators. Since encoding a number on a storage medium is accomplished by a transducer and means to produce relative movement between the transducer and medium, it follows that variations in interdigital time in dialing produces like variations in interdigital space on the medium.

It is therefore an object of the present invention to provide a telephone dial capable of producing impulses for encoding a number on a storage medium or so-called "memory" with short and uniform interdigital spacing notwithstanding the long and varied interdigital time which unavoidably results from a manual dialing operation.

A further object of the invention is to provide an improved switch which may be added to conventional dialing mechanisms for controlling power means which produces relative movement between the transducer and magnetic storage medium of an automatic dialer.

The means for accomplishing the above and further and more specific objects and advantages of the invention are made apparent in the following specification wherein reference is made to the accompanying drawing showing a preferred form of the present invention.

Figure 1:
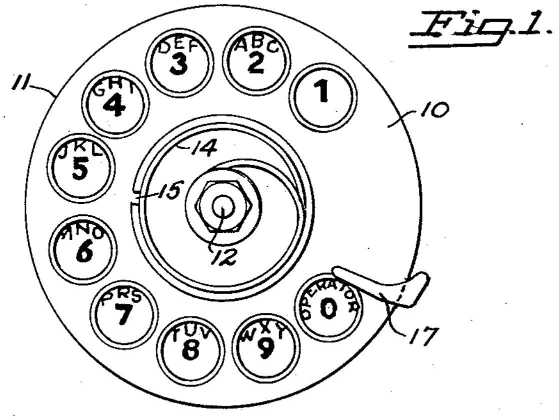
FIG. 1 is a view in front elevation of a conventional telephone dial with a central front cover removed to disclose the driving spring thereof.

A conventional telephone dial is illustrated in FIG. 1 as having a rotatable dial plate 10 with numbered finger openings 11 carried on and rotatable with a shaft 12. The dial plate is mounted in front of a stationary plate as shown at 13 in FIG. 2 and is biased in a counterclockwise direction by a spring 14, the inner end of which is anchored by means, not shown, to the stationary plate 13 and the outer end of which is anchored as at 15 to the rotatable dial plate. Thus upon rotation of the dial 10 in a clockwise direction, the spring 14 is loaded to return the dial in a counterclockwise direction when it is released and, as is well known, the angularity of movement of the dial is determined by placing a finger in any one of the finger openings 11 and rotating to the limit permitted by a stationary finger stop 17.

Figure 2:
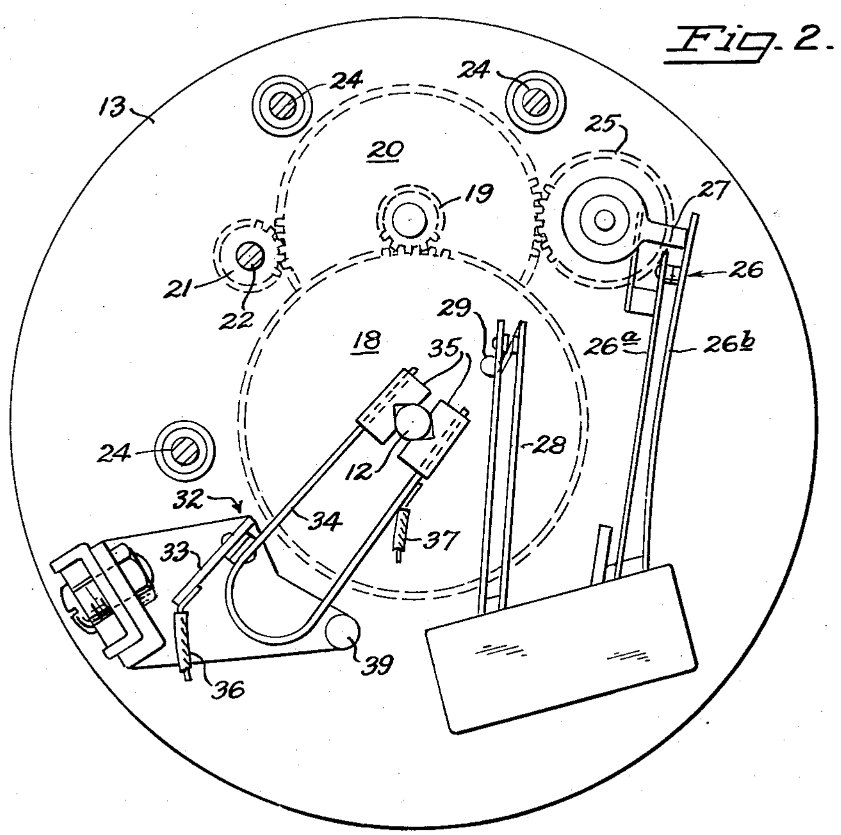
FIG. 2 is an enlarged view of the back of the same dial, illustrating the impulse creating mechanism thereof and the improved switch of the present invention and with a cover plate and the conventional governor removed.

Referring to FIG. 2, the shaft 12 which rotates with the dial is shown as supporting a gear 18 meshing with a pinion 19 fixed for rotation with a gear 20. The gear 20 meshes with and drives a pinion 21 on a governor shaft 22. The governor being conventional is not herein shown but is supported on a plate which is spaced from the main plate 13 by studs shown at 24 as 3 in number. The gear 20 also meshes with and drives a gear 25 which carries cam means (not shown) for actuating an impulse switch, generally indicated at 26. This switch is normally closed and opens when a cam rotated by gear 25 permits its arm **26*a* to swing to the left. Arm 26*b* is also biased to the left but held toward the right by a finger 27 frictionally driven by gear 25. When the dial is finger actuated, finger 27 releases arm 26*b* to prevent opening of the switch by the cam action. However upon initial return movement of the dial by the spring 14, finger 27 returns to block arm 26*b*. Thus upon release of the dial for movement in the opposite direction, under influence of the spring 14 and under control of the governor on shaft 22, the cam means controlled by gear 25 effects intermittant opening of switch 26 to create dialing impulses which conventionally would be directed into the telephone circuit. Each time that the dial is released and returns to its home position, the switch 26 is opened by the finger 27. The particular mechanism for actuating the impulse cam and the switch opening finger 27** are not disclosed herein as they form no part of the present invention, a description of which will follow.

Figure 3:
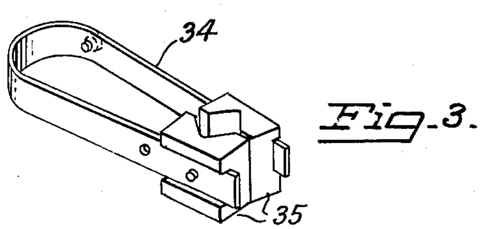
FIG. 3 is a perspective view of a part of the switch of the present invention.

When the dial mechanism, as hereinafter described, is employed for the purpose of encoding in a magnetic storage type telephone dialer, the impulse switch 26 is placed in a circuit with a transducer which encodes the impulses produced by it on a magnetized tape or the like. During encoding, the transducer is moved across the tape so that the impulses representing any digit of a telephone number are produced in spaced relationship on the tape, the spaces being equal because of the action of the governor in the dial. Since manual operation of the dial does not accomplish uniform interdigital spacing, the present invention provides a switch, generally illustrated at 32 in FIG. 2 and comprising a stationary contact member on a bracket 33 and a movable contact member on a switch arm 34. The switch arm 34, also shown in FIG. 3, is a U-shaped resilient member of conducting material with opposed V-blocks of dielectric material on the inner ends of its legs as shown at 35. These blocks are urged toward each other by resiliency of the U-shaped member 34 and embrace the shaft 12 of the dial to provide frictional contact therewith. Wires 36 and 37 are connected with the contact points through the bracket 33 and member 34, respectively, and are included in the circuit which energizes a motor for driving the transducer head to cause it to scan the tape during dialing. Thus the transducer head moves only when the switch 33 is closed. The normal position of the switch 32 is closed as shown in FIG. 2 but energization of the transducer motor is prevented by an open switch 28 which is in series with switch 32 and remains open until an encoding operation is initiated. Switch 28 is held open in the home position by engagement with a pin 29 on the gear 18 with a part of one of its resilient contact arms.

During encoding of a number on the tape of an automatic dialer by operation of the dial 10, the initial manual movement of the dial (counterclockwise as viewed in FIG. 2) swings the resilient member 34 to the right until it is stopped by engagement with a pin 39. This opens the switch to prevent closing of the circuit to the transducer motor until the dial is released to create impulses representing a digit of a telephone number. Because of frictional contact between the V-blocks 35 and the dial shaft 12, the member 34 acts to close the switch 32 almost immediately upon release of the dial to energize the transducer drive motor and set the transducer in motion a fraction of a second before creation of the first impulse. Thus the interdigital spacing between individual numbers encoded upon the magnetic tape is brief and uniform being measured by the time which elapses between the closing of the switch 32 and creation of the first impulse by the switch 26. Thus variation in time caused by lack of uniformity in dialing procedure is not reflected in the message encoded on the magnetic storage means of an automatic dialer.

The same initial movement of the dial which opens switch 32 effects closing of series switch 28 to permit the necessary energization of the transducer drive motor. However, when a digit has been recorded by return movement of the dial, pin 29 again opens switch 28 to break the circuit to the motor bringing the transducer to rest.

We claim:

1. In a telephone dial wherein a dial is affixed to a shaft which is rotatably mounted on a stationary plate, the dial and the shaft being springily urged toward a home position whenever the dial and the shaft are displaced therefrom, a switching matrix in which the individual switches are all closed only during the time the dial and the shaft are returning to their home position, such matrix comprising:

(a) a first switch having a fixed and a movable contact;

(b) means, integral with the dial, for holding the movable contact out of contact with the fixed contact only when the dial is at its home position;

(c) a second switch having a fixed and a movable contact, the two being in contact with one another when the dial is at its home position;

(d) means, frictionally engaging the shaft, for supporting the movable contact of the second switch, thereby to break the contact between the fixed and the movable contact of the second switch as the dial and the shaft are moved away from their home position; and, (e) a stop affixed to the stationary plate and disposed to limit the movement of the movable contact of the second switch as the dial and the shaft are moved from their home position, thereby to cause the fixed and the movable contact of the second switch to reclose before the dial and the shaft return to their home position.

2. In a telephone dial a switch matrix as in claim 1 wherein the mounting for the movable contact of the second switch comprises:

(a) a U-shaped resilient member, the legs of such member being disposed on opposite sides of the shaft; and, (b) a pair of V-blocks affixed to the legs of the U-shaped resilient member to frictionally engage the shaft.

References Cited by the Examiner

UNITED STATES PATENTS

| | | | |
|---|---|---|---|
| 2,573,514 | 10/1951 | Turner | 200—166 |
| 2,892,897 | 6/1959 | Vidal | 179—90 |
| 2,941,043 | 6/1960 | Ham et al. | 179—90 |
| 3,089,002 | 5/1963 | Kobler | 179—90 |

ROBERT H. ROSE, *Primary Examiner.*

J. W. JOHNSON, *Assistant Examiner.*